United States Patent [19]
Barbee et al.

[11] Patent Number: 4,552,948
[45] Date of Patent: Nov. 12, 1985

[54] POLYESTER RESINS CAPABLE OF FORMING CONTAINERS HAVING IMPROVED GAS BARRIER PROPERTIES

[75] Inventors: Robert B. Barbee; Thomas H. Wicker, Jr., both of Kingsport, Tenn.

[73] Assignee: Eastman Kodak Company, Rochester, N.Y.

[21] Appl. No.: 717,929

[22] Filed: Mar. 29, 1985

[51] Int. Cl.$^4$ ............................................. C08G 63/66
[52] U.S. Cl. ................................. 528/194; 528/193; 528/195; 528/209; 528/271
[58] Field of Search ............... 528/194, 193, 195, 209, 528/271

[56] References Cited

U.S. PATENT DOCUMENTS

| | | | |
|---|---|---|---|
| 2,470,651 | 5/1949 | Schaffel | 528/209 |
| 3,522,328 | 7/1970 | Caldwell et al. | 528/288 |
| 4,307,060 | 12/1981 | Go | 528/173 |
| 4,330,661 | 5/1982 | Go | 528/173 |
| 4,384,106 | 5/1983 | Go et al. | 528/173 |
| 4,426,512 | 1/1984 | Barbee et al. | 528/209 |
| 4,440,922 | 4/1984 | Barbee et al. | 528/194 |

*Primary Examiner*—Lester L. Lee
*Attorney, Agent, or Firm*—Clyde L. Tottle; J. Frederick Thomsen

[57] ABSTRACT

The present invention provides polyester resins useful for forming containers having improved resistance to gas permeability. The containers are formed from a polyester resin which comprises the reaction product of a diol containing up to about 8 carbon atoms and a diacid component which comprises about 5 to 50 mole percent of a first diacid selected from 1,4-phenylenedioxy diacetic acid, 1,3-phenylenedioxy diacetic acid, 1,2-phenylenedioxy diacetic acid, and mixtures thereof, and about 50 to about 95 mole percent of terephthalic acid. The polyester resin has an inherent viscosity of about 0.5 to 1.5. The containers which are provided by the present invention may be in the form of sheet, film, molded articles, such as bottles, and other such structures.

10 Claims, No Drawings

POLYESTER RESINS CAPABLE OF FORMING CONTAINERS HAVING IMPROVED GAS BARRIER PROPERTIES

DESCRIPTION

The present invention relates to polyester resins useful for forming packages for protecting comestibles. More specifically, it relates to polyester resins for forming films and molded containers which have improved gas barrier properties.

Presently there is a strong interest in the packaging industry for protecting comestibles (such as foodstuffs, medicines, and especially carbonated beverages) by enveloping the substances in packages which are formed from various polymers. One polymer in which there is an especially strong interest is polyethylene terephthalate. Containers formed from this material, which may be biaxially oriented, possess many desirable characteristics. Molded biaxially oriented containers which are formed from polyethylene terephthalate and certain copolyesters are disclosed in U.S. Pat. No. 3,733,309. While molded containers formed from polyethylene terephthalate have, as indicated, many desirable characteristics, there is a need in the art to provide improved polyester containers which will have gas permeabilities which are lower than those of containers formed from polyethylene terephthalate homopolymers. Such improved containers would be much more versatile in their utilization and allow the containers to be used to package substances for which the polyethylene terephthalate containers may not be suitable.

Another patent, U.S. Pat. No. 2,470,651, discloses the preparation of a polyester of acyl diether dicarboxylic acid and dihydric alcohols and the use of such polyester compositions as insulating coatings. Such polyesters also have good gas barrier properties when formed into film, for example. However, such polyesters do not have the structural strength properties to be formed into bottles, such as by blow molding operations. However, copolyester compositions which contain 50 percent terephthalic acid provide polymeric compositions which can be formed, for example by blow molding operations, into containers which have good structural strength properties and good gas barrier properties useful in the packaging industry. Such polyester resins, therefore, would be an advance in the state of the art.

In accordance with the present invention, it has been found that a particular polyester resin comprises the reaction product of a diol containing up to about 8 carbon atoms with a diacid component comprising about 5 to 50 mole percent of a first diacid selected from 1,4-phenylenedioxy diacetic acid, 1,3-phenylenedioxy diacetic acid, 1,2-phenylenedioxy diacetic acid, and mixtures thereof, and about 50 to about 95 mole percent of terephthalic acid. The polyester exhibits an inherent viscosity of about 0.5 to 1.5.

These polyester resins can be formed into containers having improved resistance to gas permeability. As used herein, the term "container" is intended to mean shaped articles formed from the specified polyester which are suitable for use in packaging comestibles. Such shaped articles include not only sheets and films which are extruded from the polyester and which may be used as such or as barrier layers, container liners, as components of laminates or other composites, and the like, but also articles which include blow molded containers, such as bottles.

The polyester of the present invention comprises the reaction product of a diol component and a diacid component. The diol component comprises one or more diols containing up to about 8 carbon atoms. Examples of such diols include ethylene glycol; 1,4-butanediol; 1,4-cyclohexanedimethanol; propylene glycol; diethylene glycol; 2,2,4-trimethyl-1,3-pentanediol; 2,2-dimethyl-1,3-propanediol; 2,2-diethyl-1,3-propanediol; 2-methyl-2-propyl-1,3-propanediol; 1,3-butanediol; 1,5-pentanediol; 1,6-hexanediol; 1,2-cyclohexanedimethanol; 1,3-cyclohexanedimethanol; 2,2,4,4-tetramethyl-1,3-cyclobutanediol; o-, m-, and p-xylylene diols; etc. The diol component is preferably selected from ethylene glycol, 1,4-butanediol, and 1,4-cyclohexanedimethanol, and is more preferably selected from ethylene glycol and 1,4-butanediol. Most preferably, the diol component comprises ethylene glycol. Additionally, minor amounts (i.e., less than about 50 mole percent, and, preferably, less than about 10 mole percent, based on the total amount of diol present in the polyester) of other known polyester-forming glycols may also be employed. Such diols may include, for example, 2,4-dimethyl-2-ethylhexane-1,3-diol; 2-ethyl-2-butyl-1,3-propanediol; 2-ethyl-2-isobutyl-1,3-propanediol; 2,2,4-trimethyl-1,6-hexanediol; 4,4'-sulfonyldiphenol; 4,4'-oxydiphenol; 4,4'-isopropylidenediphenol; 2,5-naphthalenediol; and other well known polyester-forming diols.

The polyester resin further comprises a diacid component. The diacid component comprises a first diacid selected from 1,4-phenylenedioxy diacetic acid, 1,3-phenylenedioxy diacetic acid, 1,2-phenylenedioxy diacetic acid, and mixtures thereof. The diacid component also includes terephthalic acid. Other well-known polyester-forming diacids may be employed in minor amounts. Such diacids may include, for example, isophthalic acid, 1,4-cyclohexanedicarboxylic acid, linear lower alkyl dicarboxylic acids, etc. The diacid component may also include acid halides and esters, particularly the lower alkyl ($C_1$–$C_4$) esters of the acids mentioned.

The first diacid, which is selected from 1,4-phenylenedioxy diacetic acid (Formula I), 1,3-phenylenedioxy diacetic acid (Formula II), 1,2-phenylenedioxy diacetic acid (Formula III), and mixtures thereof, is present in the polyester in a concentration of about 5 to 50 mole percent, based upon the total amount of diacid present in the polyester.

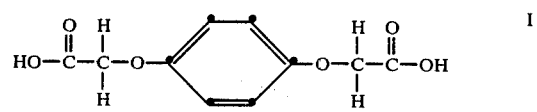

I

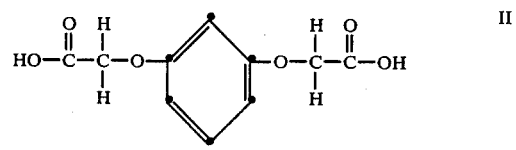

II

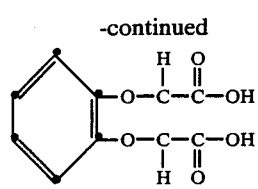

In preferred embodiments of the present invention, 1,3-phenylenedioxy diacetic acid is employed as the first diacid. The diacid component further comprises 50 to about 95 mole percent of terephthalic acid.

When the polyester is to be formed into a sheet or film, the first diacid is preferably present in an amount of at least about 15 mole percent and, more preferably, in an amount of at least about 30 mole percent (i.e., about 30 to 50 mole percent). When a molded container, such as a bottle, is desired, the first diacid is preferably present in an amount of about 5 to 20 mole percent and, more preferably, is present in an amount of about 10 to 20 mole percent.

The polyester which is employed in the present invention exhibits an I.V. of about 0.5 to 1.5. The I.V. is measured at 25° C. in a 60/40 by weight mixture of phenol/tetrachloroethane at a concentration of 0.5 g/100 ml. Polymers having an I.V. within the range specified above are of sufficiently high molecular weight to be used in the formation of the containers of the present invention.

The polyesters of the present invention are synthesized by methods generally known in the art for producing polyesters. The reactants may all be reacted in a single operation or, alternatively, sequential operation may be employed. Temperatures which are suitable for forming the polyesters generally range between about 180° C. and about 295° C., with the preferred range being about 200° to 285° C. The reaction may be conducted under an inert atmosphere, such as nitrogen. Preferably, the latter stage of the reaction is conducted under a vacuum.

Conventional catalysts are employed in the preparation of the polyester. For example, polymerization can be effected in the presence of catalytic amounts of transition metal compounds, such as antimony acetate, antimony trioxide, titanium alkoxides, and organo tin compounds (for example, stannous alkoxides). Preferred catalysts are titanium alkoxides, such as titanium tetraisopropoxide, titanium tetrabutoxides, etc. Usually, the catalysts will be present in an amount of about $10^{-5}$ to $10^{-3}$ moles of catalyst per mole of total acid employed.

Of course, suitable additives, such as dyes, pigments, plasticizers, fillers, antioxidants, stabilizers, etc., may be employed in conventional amounts. Such additives may be added directly to the reaction or may be added to the final polymer.

The polyesters described above may be formed into the containers of the present invention by conventional plastic processing techniques. For example, sheets, films, and other like structures can be formed by well-known extrusion techniques.

Film or sheet material made from the compositions of the present invention is strong, flexible, and clear. It may be formed into articles such as wrappers, bags, and the like.

The polyesters may also be used to form a laminating layer between two or more permeable layers of film. In like manner, a layer of the polyester of the present invention (preferably, a composition containing about 50% of the first diacid), may be coextruded as a pipe or similar structure between two or more permeable layers. The polyesters may also be used for dip coating containers from a polymer solution in order to improve the barrier properties of a package. In each of these embodiments, the present invention offers the additional advantage of not requiring the use of a tie layer.

Molded containers can be made from the abovedescribed polyester by compression molding, blow molding, and other such molding techniques, all of which are well known in the art. Preferred molded containers are biaxially oriented blow-molded containers.

The above-described containers of the present invention are ideally suited for protecting comestibles, such as foodstuffs (especially carbonated soft drinks), medicines, and like substances. The advantages of these containers are due to low oxygen and carbon dioxide permeability relative to polyethylene terephthalate. Because of the decreased gas transmission rates of these polyesters, they perform well in packaging applications where improved gas barrier properties are required. Typically, the containers of the present invention exhibit an oxygen permeability of less than about 8.5 (preferably, less than about 7.5) and a carbon dioxide permeability of less than about 50 (preferably, less than about 30), measured as cubic centimeters permeating a 1 mil thick sample, 100 inches square, for a 24 hour period under a partial pressure difference of 1 atmosphere at 30° C.

This invention will be further illustrated by the following examples, although it will be understood that these examples are included merely for purposes of illustration and are not intended to limit the scope of the invention.

EXAMPLE 1

This example illustrates the improved gas barrier properties of containers formed of polyethylene terephthalate which has been modified with 5 mole percent of 1,4-phenylenedioxy diacetic acid.

A reaction vessel was charged with dimethyl terephthalate, ethylene glycol, 5 mole percent of 1,4-phenylenedioxy diacetic acid, based upon the total diacid present, and 100 ppm of titanium from titanium tetraisopropoxide. The reaction mixture was heated and stirred under nitrogen at 200° C. for 60 minutes. The temperature was then increased to 210° C. for 120 minutes until all of the methanol and water had distilled out of the reaction mixture. The temperature was then raised to 275° C., the nitrogen was evacuated from the reaction system, and a vacuum was applied. The melt condensation was continued at 275° C. for 90 minutes under 0.5 mm Hg pressure. The heating was discontinued, the reaction mixture was brought to atmospheric pressure with nitrogen, and the polymer was collected.

The oxygen permeability of the polyester was determined in cubic centimeters permeating a 1 mil thick sample, 10 inches square, for a 24-hour period under an oxygen partial pressure difference of one atmosphere at 30° C. using a MOCON Oxtran 100 instrument. The polyester was extruded into amorphous (i.e., unoriented) film using a Brabender extruder at 240°–260° C. The film actually used to measure permeability was 3–8 mils in thickness, but the permeability was converted to a one mil basis using conventional calculations. In like manner, the carbon dioxide permeability of the polyester was determined using a MOCON Permatran C instrument.

The results are given in Table I.

EXAMPLE 2

Example 1 was repeated except that 1,4-phenylenedioxy diacetic acid was replaced with 1,3-phenylenedioxy diacetic acid. The oxygen permeability and carbon dioxide permeability of the polyester were determined as in Example 1, and the results are given in Table I.

EXAMPLE 3

Example 1 was repeated except that 10 mole percent of 1,4-phenylenedioxy diacetic acid was employed. The oxygen permeability and carbon dioxide permeability of the polyester were determined as in Example 1, and the results are given in Table I.

EXAMPLE 4

Example 3 was repeated except that 1,4-phenylenedioxy diacetic acid was replaced with 1,3-phenylenedioxy diacetic acid. The oxygen permeability and carbon dioxide permeability of the polyester were determined as in Example 1, and the results are given in Table I.

EXAMPLE 5

Example 3 was repeated except that 1,4-phenylenedioxy diacetic acid was replaced with 1,2-phenylenedioxy diacetic acid. The oxygen permeability of the polyester was determined as in Example 1, and the results are given in Table I.

EXAMPLE 6

Example 1 was repeated except that 20 mole percent of 1,4-phenylenedioxy diacetic acid was employed. The oxygen permeability and carbon dioxide permeability of the polyester were determined as in Example 1, and the results are given in Table I.

EXAMPLE 7

Example 6 was repeated except that 1,4-phenylenedioxy diacetic acid was replaced with 1,3-phenylenedioxy diacetic acid. The oxygen permeability and carbon dioxide permeability of the polyester were determined as in Example 1, and the results are given in Table I.

EXAMPLE 8

Example 6 was repeated except that 1,4-phenylenedioxy diacetic acid was replaced with 1,2-phenylenedioxy diacetic acid. The oxygen permeability of the polyester was determined as in Example 1, and the results are given in Table I.

EXAMPLE 9

Example 1 was repeated except that 50 mole percent of 1,4-phenylenedioxy diacetic acid was employed. The oxygen permeability of the polyester was determined as in Example 1, and the results are given in Table I.

EXAMPLE 10

Example 9 was repeated except that 1,4-phenylenedioxy diacetic acid was replaced with 1,3-phenylenedioxy diacetic acid. The oxygen permeability of the polyester was determined as in Example 1 and the results are given in Table I.

EXAMPLE 11

A reaction vessel was charged with 22.42 grams of 1,4-phenylenedioxy diacetic acid, 24.60 grams of ethylene glycol, and 100 ppm of titanium from titanium tetraisopropoxide. The reaction mixture was heated and stirred under nitrogen at 210° C. for 60 minutes. The temperature was then increased to 220° C. for 120 minutes until all of the water had distilled out of the reaction mixture. The temperature was then raised to 260° C., the nitrogen was evacuated from the reaction system, and a vacuum was applied. The melt condensation was continued at 260° C. for 75 minutes under 0.5 mm Hg pressure. The heating was discontinued, the reaction mixture was brought to atmospheric pressure with nitrogen, and the polymer was collected. The polymer had an inherent viscosity of 0.88. The oxygen permeability and carbon dioxide permeability of the polyester were determined as in Example 1. The results are given in Table I.

EXAMPLE 12

Example 11 was repeated except that 1,3-phenylenedioxy diacetic acid was used in place of 1,4-phenylenedioxy diacetic acid. The resulting polymer had an I.V. of 0.56. The oxygen permeability and carbon dioxide permeability of the polyester were measured as in Example 1, and the results are given in Table I.

COMPARATIVE EXAMPLE 1

A control sample of polyethylene terephthalate was prepared according to the procedure given in Example 1. The oxygen permeability and carbon dioxide permeability of the sample were determined as in Example 1, and the results are given in Table I.

COMPARATIVE EXAMPLE 2

Example 3 was repeated except that 1,4-phenylenedioxy diacetic acid was replaced with 2,2'-[1,4-phenylenebis(oxy)]bisethanol. The oxygen permeability and carbon dioxide permeability of the polyester were determined as in Example 1, and the results are given in Table I.

TABLE I

| Run | Oxygen Permeability | $CO_2$ Permeability |
|---|---|---|
| Ex. 1 | 8.3 | 47 |
| Ex. 2 | 7.5 | 49 |
| Ex. 3 | 6.3 | 39 |
| Ex. 4 | 5.0 | 26 |
| Ex. 5 | 6.2 | — |
| Ex. 6 | 4.8 | 22 |
| Ex. 7 | 3.1 | 18 |
| Ex. 8 | 3.2 | — |
| Ex. 9 | 1.0 | — |
| Ex. 10 | 0.6 | — |
| Ex. 11 | 0.6 | 4.5 |
| Ex. 12 | 0.1 | 0.6 |
| Comp. Ex. 1 | 10.0 | 59 |
| Comp. Ex. 2 | 11.0 | 63 |

An analysis of the data of Table I indicates the superior properties exhibited by the polyesters of the present invention which make them extremely advantageous for use in the formation of containers. It will be noted that the compositions described in the examples, without exception, exhibit oxygen and, for those compositions tested, carbon dioxide permeabilities below those exhibited by polyethylene terephthalate as exemplified by Comparative Example 1. The data of Table I further indicate that, while all the compositions are useful for the formation of improved containers, those compositions employing the meta isomer are preferred due to their improved resistance to gas permeability.

The uniqueness of the polyesters of the present invention and of the properties exhibited by containers formed therefrom is indicated by a comparison of the Examples with Comparative Example 2, which employs a structurally similar glycol for the second diacid. However, the polyester of Comparative Example 2 exhibits poor resistance to gas permeability, whereas the compositions of the Examples of the present invention demonstrate a much improved resistance to gas permeability, as compared to polyethylene terephthalate.

While the invention has been described in detail with particular reference to preferred embodiments thereof, it will be understood that variations and modifications can be effected within the spirit and scope of the invention.

We claim:

1. A polyester composition capable of being formed into molded containers having good gas barrier properties comprising the reaction product of
    (A) a diol containing up to about 8 carbon atoms, and
    (B) a diacid component comprising
        (i) about 5 to 50 mole percent of at least one first diacid selected from the group consisting of 1,4-phenylenedioxy diacetic acid, 1,3-phenylenedioxy diacetic acid and 1,2-phenylenedioxy diacetic acid, and,
        (ii) about 50 to about 95 mole percent of terephthalic acid,
   wherein said polyester has an inherent viscosity of about 0.5 to 1.5.

2. The polyester of claim 1 wherein said diol comprises ethylene glycol, 1,4-butanediol, 1,4-cyclohexanedimethanol, or a mixture thereof.

3. The polyester of claim 2 wherein said diol is ethylene glycol.

4. The polyester of claim 3 wherein said first diacid is 1,4-phenylenedioxy diacetic acid.

5. The polyester of claim 3 wherein said first diacid is 1,3-phenylenedioxy diacetic acid.

6. The polyester of claim 3 wherein said first diacid is 1,2-phenylenedioxy diacetic acid.

7. The polyester of claim 1 wherein said first diacid is present in a concentration of about 5 to 50 mole percent.

8. The polyester of claim 7 wherein said first diacid is 1,4-phenylenedioxy diacetic acid.

9. The polyester of claim 7 wherein said first diacid is 1,3-phenylenedioxy diacetic acid.

10. The polyester of claim 7 wherein said first diacid is 1,2-phenylenedioxy diacetic acid.

* * * * *

UNITED STATES PATENT AND TRADEMARK OFFICE
CERTIFICATE OF CORRECTION

PATENT NO. : 4,552,948

DATED : November 12, 1985

INVENTOR(S) : Robert B. Barbee et al.

It is certified that error appears in the above-identified patent and that said Letters Patent is hereby corrected as shown below:

The term of this patent subsequent to April 3, 20001 has been disclaimed.

Signed and Sealed this

Twenty-second Day of April 1986

[SEAL]

Attest:

DONALD J. QUIGG

Attesting Officer

Commissioner of Patents and Trademarks